US009963983B2

(12) United States Patent
Velthuis

(10) Patent No.: US 9,963,983 B2
(45) Date of Patent: May 8, 2018

(54) TURBOCHARGER

(71) Applicant: Bayerische Motoren Werke Aktiengesellschaft, Munich (DE)

(72) Inventor: Jan Velthuis, Landsberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 72 days.

(21) Appl. No.: 14/573,650

(22) Filed: Dec. 17, 2014

(65) Prior Publication Data

US 2015/0104303 A1    Apr. 16, 2015

Related U.S. Application Data

(63) Continuation of application No. PCT/EP2013/060376, filed on May 21, 2013.

(30) Foreign Application Priority Data

Jun. 29, 2012  (DE) .................... 10 2012 211 375.4

(51) Int. Cl.
*F04D 29/42* (2006.01)
*F01D 9/04* (2006.01)
(Continued)

(52) U.S. Cl.
CPC ............. *F01D 9/04* (2013.01); *F01D 25/24* (2013.01); *F01D 25/246* (2013.01); *F02B 39/00* (2013.01);
(Continued)

(58) Field of Classification Search
CPC .......... F01D 9/04; F01D 25/24; F01D 25/246; F01D 25/04; F01D 29/4206;
(Continued)

(56) References Cited

U.S. PATENT DOCUMENTS 3,975,911 A * 8/1976 Morgulis .................. F02C 6/12
415/146
4,296,934 A   10/1981 Atkin
(Continued)

FOREIGN PATENT DOCUMENTS

DE    38 31 687 A1    3/1990
DE    43 12 078 A1    10/1994
(Continued)

OTHER PUBLICATIONS

International Search Report (PCT/ISA/210) dated Nov. 11, 2013 with English translation (eight pages).
(Continued)

*Primary Examiner* — Richard Edgar
(74) *Attorney, Agent, or Firm* — Crowell & Moring LLP

(57) ABSTRACT

A turbocharger for an internal combustion engine having a housing, an impeller arranged in the housing interior having an impeller shaft and being mounted in a bearing block, and an intermediate element between the impeller and the bearing block. The housing includes at least one flow channel for feeding or discharging a fluid to or from the impeller, and the intermediate element includes a wall section that delimits a least a section of at least one of the flow channels.

9 Claims, 4 Drawing Sheets

(51) Int. Cl.
F04D 25/04 (2006.01)
F02C 6/12 (2006.01)
F04D 29/44 (2006.01)
F04D 29/62 (2006.01)
F01D 25/24 (2006.01)
F02B 39/00 (2006.01)
F04D 29/54 (2006.01)
F02B 37/02 (2006.01)

(52) U.S. Cl.
CPC .............. *F02C 6/12* (2013.01); *F04D 25/04* (2013.01); *F04D 29/4206* (2013.01); *F04D 29/441* (2013.01); *F04D 29/547* (2013.01); *F04D 29/624* (2013.01); *F02B 37/025* (2013.01); *F05D 2220/40* (2013.01)

(58) Field of Classification Search
CPC .... F01D 29/441; F01D 29/547; F01D 29/624; F02B 39/00; F02C 6/12
See application file for complete search history.

(56) References Cited

U.S. PATENT DOCUMENTS

| | | | |
|---|---|---|---|
| 4,704,075 A * | 11/1987 | Johnston | F01D 25/125 417/407 |
| 4,815,184 A | 3/1989 | Johnston et al. | |
| 5,406,796 A | 4/1995 | Hiereth et al. | |
| 2007/0089414 A1 | 4/2007 | Yokoyama et al. | |
| 2008/0138196 A1 | 6/2008 | Meier et al. | |
| 2009/0290980 A1* | 11/2009 | Higashimori | F01D 17/148 415/205 |
| 2012/0257966 A1 | 10/2012 | Boening et al. | |

FOREIGN PATENT DOCUMENTS

| | | |
|---|---|---|
| DE | 102 56 418 A1 | 6/2004 |
| DE | 10 2009 053 237 A1 | 5/2011 |
| EP | 1 672 181 A1 | 6/2006 |
| JP | 2007-113501 A | 5/2007 |
| JP | 2008-208732 A | 9/2008 |
| WO | WO 2011/084283 A2 | 7/2011 |

OTHER PUBLICATIONS

German Search Report dated Apr. 18, 2013 with partial English translation (10 pages).
English translation of Chinese Office Action issued in counterpart Chinese Application No. 201380030997.9 dated Feb. 1, 2016 (nine pages).
Chinese Office Action issued in counterpart Chinese Application No. 201380030997.9 dated Dec. 2, 2016 with English translation (16 pages).
Chinese-language Office Action issued in counterpart Chinese Application No. 201380030997.9 dated Jan. 10, 2018 with English translation (10 pages).

* cited by examiner

TURBOCHARGER

CROSS REFERENCE TO RELATED APPLICATIONS

This application is a continuation of PCT International Application No. PCT/EP2013/060376, filed May 21, 2013, which claims priority under 35 U.S.C. § 119 from German Patent Application No. 10 2012 211 375.4, filed Jun. 29, 2012, the entire disclosures of which are herein expressly incorporated by reference.

BACKGROUND AND SUMMARY OF THE INVENTION

The invention relates to an exhaust gas turbocharger for an internal combustion engine.

Exhaust gas turbochargers are being increasingly used in motor vehicles comprising internal combustion engines, for example, and allow an increase in performance, which can be used, among other things, to lower the fuel consumption of the vehicle.

Such exhaust gas turbochargers generally comprise a separate compressor housing and a separate turbine housing, in each of which an impeller (compressor impeller or turbine impeller) is disposed. Each housing has a connecting point for the direct connection to the respective other housing, or for the connection to a bearing block disposed between the two housings, wherein the connecting points in each case include an aperture for inserting the components of the exhaust gas turbocharger into the respective housing. The bearing block is designed to rotatably mount an impeller shaft, which carries the two impellers and non-rotatably couples them to each other.

For example, the two housings can be designed as radial compressor and radial turbine housings, and for this purpose have a complex and delicate shape having one or more spiral- or snail-shaped flow channels, so that the production thereof poses a particular challenge.

The housings are typically produced by way of known metal casting processes using cores for shaping a housing interior space enclosed by the core. The complex and delicate shape of the previously known housings, however, means that a negative mold for casting this shape is difficult to implement with cores. For example, very small material thicknesses of the cores occur locally, whereby the cores are at increased risk of breaking in particular in these regions. The risk of breakage is intensified by an aspiration thus far to minimize the housing openings and apertures, and in particular the aperture in the region of the connecting point for the connection to the bearing block or to the respective other housing, so that it is just barely still possible to insert the impeller, and other components of the exhaust gas turbocharger where necessary, through this aperture.

In addition to the difficulties of the production process as such described here, the production by way of metal casting processes additionally causes the cast part that is generated to be subject to large manufacturing tolerances in terms of the dimensions of the part. While these can in part be compensated for through post-processing, post-processing in particular can be carried out only to a limited extent due to the complex and delicate shape and the resulting narrow, difficult-to-access housing interior. In this way, in particular accessibility for a corresponding tool for fast and simple post-processing is made more difficult or even prevented.

The result is that high manufacturing tolerances of the housing can be compensated for only with difficulty, specifically in the housing interior. For example, so as to still be able to provide sufficient running freedom and a minimum value for a clearance between the impeller and inside wall of the housing interior for the particular impeller, the clearance must be selected accordingly larger with a flat allowance so that a use remains possible even in the event of unfavorable tolerance values of the housing.

This is inconsistent with a basic endeavor to provide as small a clearance as possible between the housing wall and the impeller for fluid mechanics and thermodynamics considerations in order to achieve the best possible efficiency. As a result, at present the only option that remains is that of providing comparatively large clearances between the impeller and housing wall and accepting accordingly reduced efficiency, due to the described high tolerance variances of the cast housings.

The high manufacturing tolerances of the cast housings additionally lead to comparatively imprecise axial positioning of the impeller with respect to a flow channel that is integrated in the housing. The direct consequence of an imprecise relative position is that the flow conditions in the housing interior are negatively impacted and, attendant therewith, the efficiency of the entire exhaust gas turbocharger is further reduced.

Therefore, it is the object of the invention to provide an exhaust gas turbocharger which at least reduces the described drawbacks, and in particular enables simpler production or assembly that is as exact as possible, and also enables improved efficiency.

According to the invention, an exhaust gas turbocharger for an internal combustion engine is provided, comprising:
  a housing and a housing interior that is at least partially enclosed by the housing;
  an impeller, which is disposed in the housing interior and which is rotatably mounted with an impeller shaft in a bearing block,
  wherein the housing comprises at least one flow channel for supplying a fluid to, or discharging the same from, the impeller, and an intermediate element is disposed coaxially to the impeller shaft between the impeller and the bearing block and forms a wall at least in sections, which is designed to delimit at least one of the flow channels at least in sections.

The exhaust gas turbocharger thus comprises an intermediate element that is preferably designed as a separate component and, when installed, is disposed between the impeller and the bearing block. For this purpose, the intermediate element can be directly and coaxially connected to the impeller shaft in rotatable manner, wherein the intermediate element is disposed in a stationary manner with respect to the housing and the impeller shaft is rotatable with respect to the intermediate element. The intermediate element can in particular be attached coaxially to this shaft on the bearing block.

In addition, the intermediate element is designed in such a way that the same, together with one or more sections, forms a wall for a portion of the flow channel. In other words, the flow channel is delimited in a first section by the housing itself and in a second section by the intermediate element, at least one the side facing a flow. It goes without saying that the intermediate element can likewise form a plurality of walls for one or more flow channels.

This offers the advantage that the housing does not have to be designed to completely form the flow channel, but can be cut out, for example, in those regions in which the intermediate element is provided instead for delimitation of the flow channel. The flow channel is thus formed completely only by joining the two components.

The more generous cut-out of the housing made possible in this way enables improved accessibility of the housing interior with a suitable arrangement, so that the access for tools, and thus post-processing of the housing, is facilitated. It becomes possible to carry out exact shaping of the inside wall of the housing or of the housing interior after a casting process. In this way, it is even possible to attain narrow tolerance values in the housing interior and thereby achieve an optimized geometry of the exhaust gas turbocharger. It is made easier in this way, for example, to exactly match a clearance between the impeller and the inside wall to a fluid-dynamically and thermodynamically optimal value, whereby the efficiency of the exhaust gas turbocharger can be additionally improved.

Such a more generous cut-out of the housing additionally offers the advantage of at least reducing thermomechanical stresses in a wall of the housing. Thermodynamic stresses occur with strong local heating of the housing between regions having differing degrees of heating, for example. This typically results in stress cracks, which would cause the particular component, which here is the exhaust gas turbocharger, to fail. While small housing openings impart high flexural strength to the housing, the described larger cut-out of the housing causes a certain degree of softness or compliance, which makes it possible to compensate for temperature-related and locally varying expansions (to a certain degree) and thus reduce the thermomechanical stresses or the stress cracks resulting therefrom.

According to one embodiment, the intermediate element has a disk-shaped extension extending substantially radially to the impeller shaft, wherein the disk-shaped extension forms the wall that delimits the at least one flow channel at least in sections. This extension is preferably designed in such a way that the extension can be inserted into a corresponding recess in the housing and, as described above, when inserted defines the wall of the one or more flow channels at least in sections.

Moreover, the disk-shaped extension can have an outer diameter which is larger than an outer diameter of the impeller. Depending on the size of the diameter, an accordingly larger recess of the housing can thus be provided, which offers improved access to the interior of the housing as the size increases.

The disk-shaped extension can furthermore have an outer diameter which is larger than an inner diameter of a partition of a flow channel. A partition as defined by the present invention shall be understood to mean a lateral wall of a single flow channel and an intermediate wall for separating two neighboring flow channels. The inner diameter of the partition shall be understood to mean in particular double the radial distance between a rotational axis of the impeller shaft and an edge (tongue) of the partition facing the impeller shaft. If the disk-shaped extension is larger than the inner diameter of the partition, this means that, when not installed, the partition is advantageously easily accessible for post-processing at least in the region of this edge.

For example, the at least one flow channel can have a spiral shape and be aligned in a plane that is oriented substantially radially to the impeller shaft, so that the housing is designed as a radial compressor housing or as a radial turbine housing.

According to a further embodiment, the intermediate element is designed for radial and/or axial positioning and/or support of the bearing block. For example, the housing is designed in such a way that it is able to accommodate the disk-shaped extension of the intermediate element with precise fit in a recess having a complementary design, so as to position and support the same in the radial direction. The intermediate element can be attached to the bearing block, for example, in particular by way of a form-locked and/or force-fit connection. An (optionally additional) integral joint is likewise possible.

The intermediate element can additionally comprise an axial stop for axially fixing the intermediate element relative to the housing. In this way, exact positioning of the intermediate element in the axial direction is established. In addition, the components that are directly, or at least indirectly, connected to the intermediate element are positioned accordingly clearly and reproducibly, such as the impeller with respect to the flow channel and/or an inside wall of the housing.

Moreover, the intermediate element can be designed as a substantially crucible-shaped adapter element for axial insertion into the interior of the housing, wherein at least the disk-shaped extension of the intermediate element, when inserted, ends flush, and in particular flush over an area, with a wall of a flow channel of the housing. The adapter element is provided with a peripheral and angled collar-shaped edge section serving as a stop.

For example, the disk-shaped extension can additionally peripherally comprise a seal, in particular a peripheral sealing ring in the circumferential direction, for sealing the intermediate element with respect to the housing. In this way, a fluid-tight separation is created between the impeller and the bearing block disposed on the opposite side of the intermediate element. In particular hot gases can be prevented from passing from the region of the impeller in the direction of the bearing block. The seal can preferably be disposed in a corresponding recess of the intermediate element, in particular in a peripheral groove in the disk-shaped extension, or in a corresponding recess of the housing.

The impeller is preferably a turbine impeller or a compressor impeller.

Other objects, advantages and novel features of the present invention will become apparent from the following detailed description of one or more preferred embodiments when considered in conjunction with the accompanying drawings.

DETAILED DESCRIPTION

Figure 1:
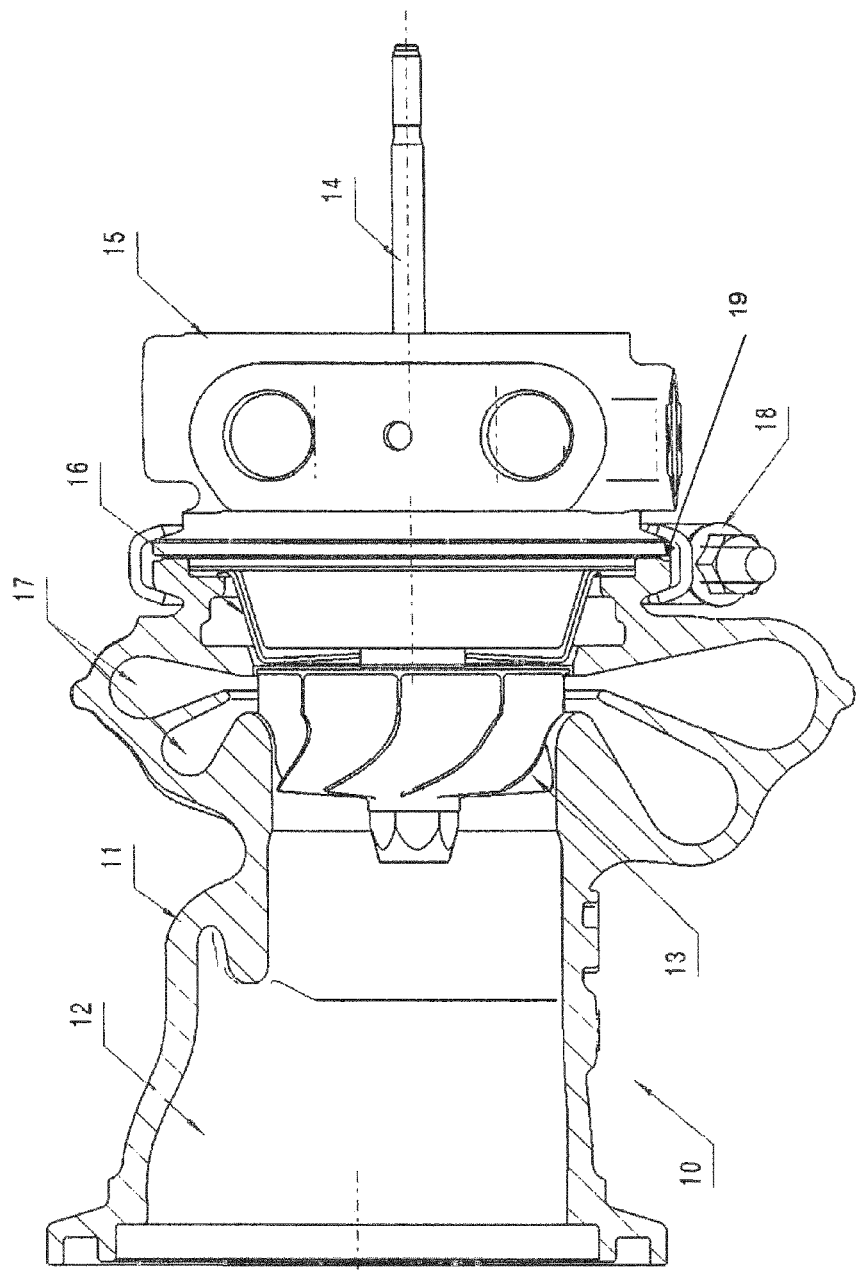
FIG. 1 shows a turbine assembly for an exhaust gas turbocharger according to the prior art.

FIG. 1 shows a turbine assembly 10 for an exhaust gas turbocharger according to the prior art. The the shown turbine assembly 10 comprises a housing 11 and a housing interior 12 that is at least partially enclosed by the housing 11. A turbine impeller 13, which is rotatably mounted with an impeller shaft 14 in a bearing block 15, is disposed in the housing interior 12. The housing 11 moreover has two flow channels 17 for supplying an exhaust gas flow to the turbine impeller 13 so as to cause the same to perform a rotational movement. A shielding element 16 is disposed between the impeller 13 and the bearing block 15. The shielding element 16 has a sheet metal shape and shields the bearing block 15 with respect to heat application from the direction of the turbine impeller 13 or the flow channels 17. In the embodiment shown, the housing 11 is connected to the bearing block 15 via a flange connection 19 and by way of a clamp 18 embracing this flange connection 19.

Figure 2:
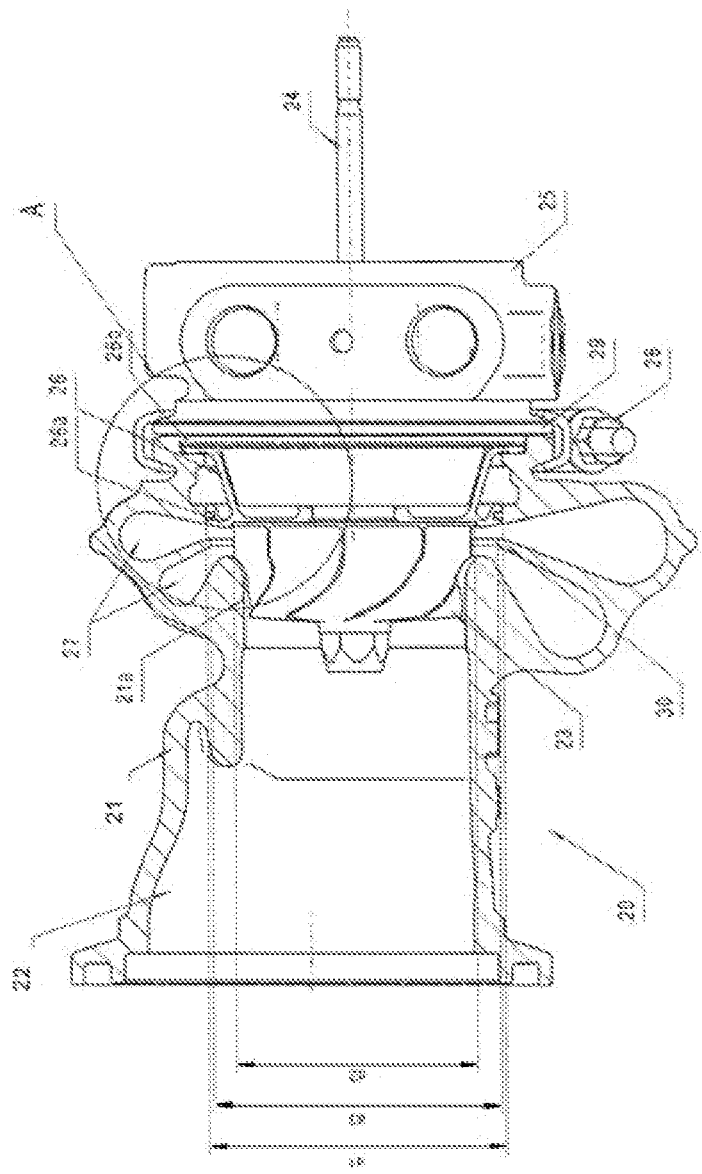
FIG. 2 shows a turbine assembly for an exhaust gas turbocharger according to an embodiment of the present invention.
Figure 4:
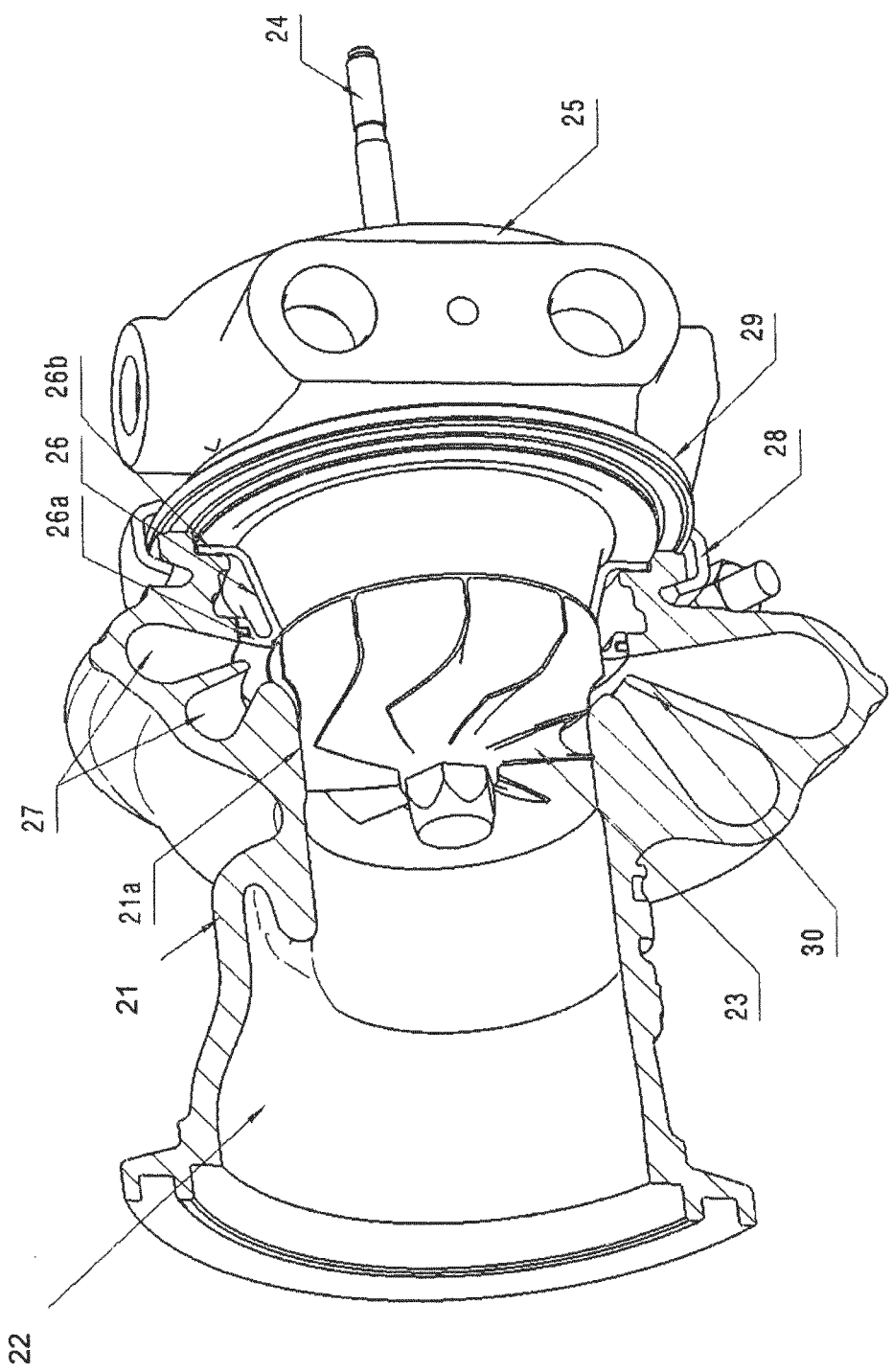
FIG. 4 is a perspective sectional view of the turbine assembly shown in FIG. 2.

FIG. 2 and FIG. 4 show a side and perspective sectional view of a turbine assembly 20 for an exhaust gas turbocharger of an internal combustion engine comprising a housing 21 and a housing interior 22 at least partially enclosed by the housing 21. A turbine impeller 23, which is rotatably mounted with an impeller shaft 24 in a bearing block 25, is disposed in the housing interior 22. The housing 21 moreover has two flow channels 27 for supplying an exhaust gas flow to the turbine impeller 23 so as to cause the same to perform a rotational movement. In the embodiment shown, the housing 21 is connected to the bearing block 25 via a flange connection 29 and by way of a clamp 28 embracing this flange connection 29. Other connecting means and methods are also possible, of course, including other force-fit and/or form-locked, but also integral connections.

Figure 3:
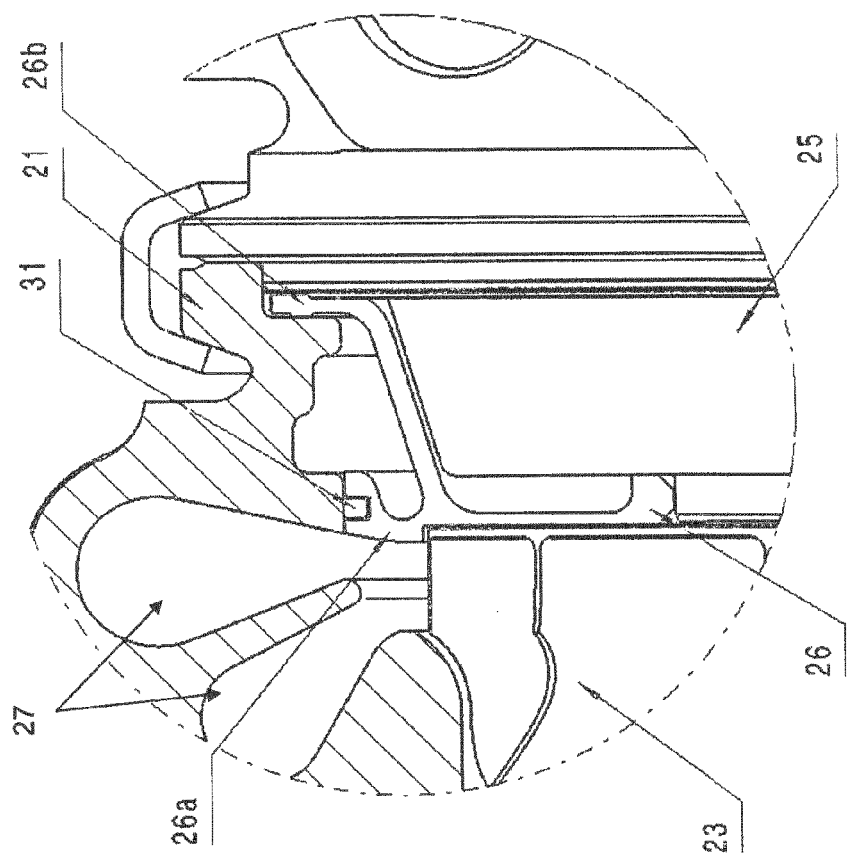
FIG. 3 is a detailed view of an intermediate element of the turbine assembly of FIG. 2.

An intermediate element 26 is disposed between the impeller 23 and the bearing block 25. The intermediate element 26 is shown in detail in FIG. 3 and is designed in such a way that it forms a wall in sections, which is used to delimit one of the two flow channels 27 in sections. For this purpose, the intermediate element 26 has a disk-shaped extension 26a extending substantially radially to the impeller shaft 24, wherein the disk-shaped extension 26a forms the wall that delimits the flow channel 27 in sections. The intermediate element 26 additionally acts as a shielding element to protect the bearing block 25.

The disk-shaped extension 26a is designed in such a way that it has an outer diameter d1 which is larger than an outer diameter d2 of the turbine impeller 23. This offers the advantage that the housing 21 can have a larger aperture in the region of the flange connection and in the region of the flow channels 27 than is possible according to the prior art (see FIG. 1). Instead of the housing 21, the intermediate element 26 assumes the task of delimiting the flow channel 27 in the region of this aperture or of the corresponding recess.

When not installed, the inside wall of the housing can thus be reached and post-processed in a particularly simple manner by way of a suitable tool, in particular in a region 21a facing the impeller, so that accordingly tight tolerance specifications can be adhered to, for example for a clearance between the impeller and the inside wall.

In addition, the outer diameter d1 of the disk-shaped extension 26a is likewise larger than an inner diameter d3 of a partition 30 of a flow channel 27. In the embodiment shown, this partition 30 is disposed as a partition 30 between the two neighboring flow channels 27. This embodiment additionally enables particularly easy accessibility of a tip of the partition facing the impeller shaft, so that this can also be matched to corresponding tolerance specifications by way of a suitable tool and, in this way, fluid dynamics and thermodynamics aspects can be taken into consideration for as optimal efficiency of the exhaust gas turbocharged as possible.

Each of the two flow channels 27 has a spiral shape and they are aligned in a plane that is oriented substantially radially to the impeller shaft 24 (perpendicular to the image plane).

The intermediate element 26 is additionally designed for radial and axial positioning and support of the bearing block 25. For this purpose, the intermediate element 26 is supported with respect to the housing 21 in the radial direction by way of the disk-shaped extension 26a.

An axial stop 26b is used to axial position the intermediate element 26, for example. Due to the flange-shaped design and a form-locked arrangement in the region of the flange connection 29, the axial stop 26b is additionally axially fixed with respect to the housing 21.

In other words, the intermediate element is designed as a crucible-shaped adapter element for axial insertion into the interior of the housing in the direction of the impeller shaft 24, wherein at least the disk-shaped extension of the intermediate element, when inserted, ends flush, and in particular flush over an area, with a wall of a flow channel of the housing. The intermediate element is additionally axially fixed on the housing with an edge of the "crucible," as was already described above.

Merely optionally, the disk-shaped extension 26a can peripherally comprise a seal, for example in the form of a peripheral sealing ring 31 in the circumferential direction, for sealing the intermediate element with respect to the housing 21. For this purpose, the seal can be inserted into a groove of the disk-shaped extension 26 which is likewise peripheral in the circumferential direction.

It goes without saying that, instead of the illustrated turbine impeller, the impeller can also be designed as a compressor impeller, with corresponding reversal of a flow direction for compressing air that is taken in.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas turbocharger for an internal combustion engine, comprising:
    a housing having a housing interior that is at least partially enclosed by the housing;
    an impeller with an impeller shaft disposed in the housing interior and rotatably mounted in a bearing block; and
    an intermediate element arranged coaxially to the impeller shaft, the intermediate element having a bearing block side axially adjacent to the bearing block, an impeller side axially adjacent to the impeller, and a crucible-shaped wall portion extending axially between the impeller side and the bearing block side,
    wherein
        the housing includes at least one flow channel configured to supply fluid to, or discharge fluid from, the impeller,
        a radially outer flange at the bearing block side of the intermediate element is axially fixed between an axial stop surface of the housing and an axial stop surface of the bearing block,
        at least one of the housing and the bearing block axially overlaps the intermediate element flange in a region radially outside the intermediate element flange, the housing and the bearing block have adjacent axially-opposed faces in the region radially outside the intermediate element flange, and at the impeller side of the intermediate element at least a section of the intermediate element forms an impeller-side wall delimiting at least a section of at least one of the at least one flow channels having an outer radius smaller than an inner radius of the axial stop surface of the housing at the bearing block side of the intermediate element.

2. The exhaust gas turbocharger according to claim 1, wherein the impeller-side wall of the intermediate element has a disk-shaped extension extending substantially radially to the impeller shaft forming the wall.

3. The exhaust gas turbocharger according to claim 2, wherein the disk-shaped extension has an outer diameter larger than an outer diameter of the impeller.

4. The exhaust gas turbocharger according to claim 3, wherein the disk-shaped extension has an outer diameter larger than an inner diameter of a partition of at least one of the at least one flow channels.

5. An exhaust gas turbocharger according to claim 4, wherein each of the at least one flow channels has a spiral shape and is aligned in a plane oriented substantially radially to the impeller shaft.

6. An exhaust gas turbocharger according to claim 5, wherein the intermediate element is configured to be radially positioned on a corresponding radial support surface of the housing.

7. An exhaust gas turbocharger according to claim 4, wherein the intermediate element is configured for axial insertion into the housing interior such that when fully inserted a section of the disk-shaped extension of the intermediate element is flush with an adjacent wall of the at least one of the at least one flow channels.

8. An exhaust gas turbocharger according to claim 2, wherein the disk-shaped extension includes a circumferential peripheral seal between the intermediate element and the housing.

9. An exhaust gas turbocharger according to claim 1, wherein the intermediate element is a shielding element between the impeller and the bearing block.

* * * * *